Sept. 8, 1953 — D. DILEO — 2,651,382
PLUMBING TRAP CLEANER
Filed Oct. 9, 1950
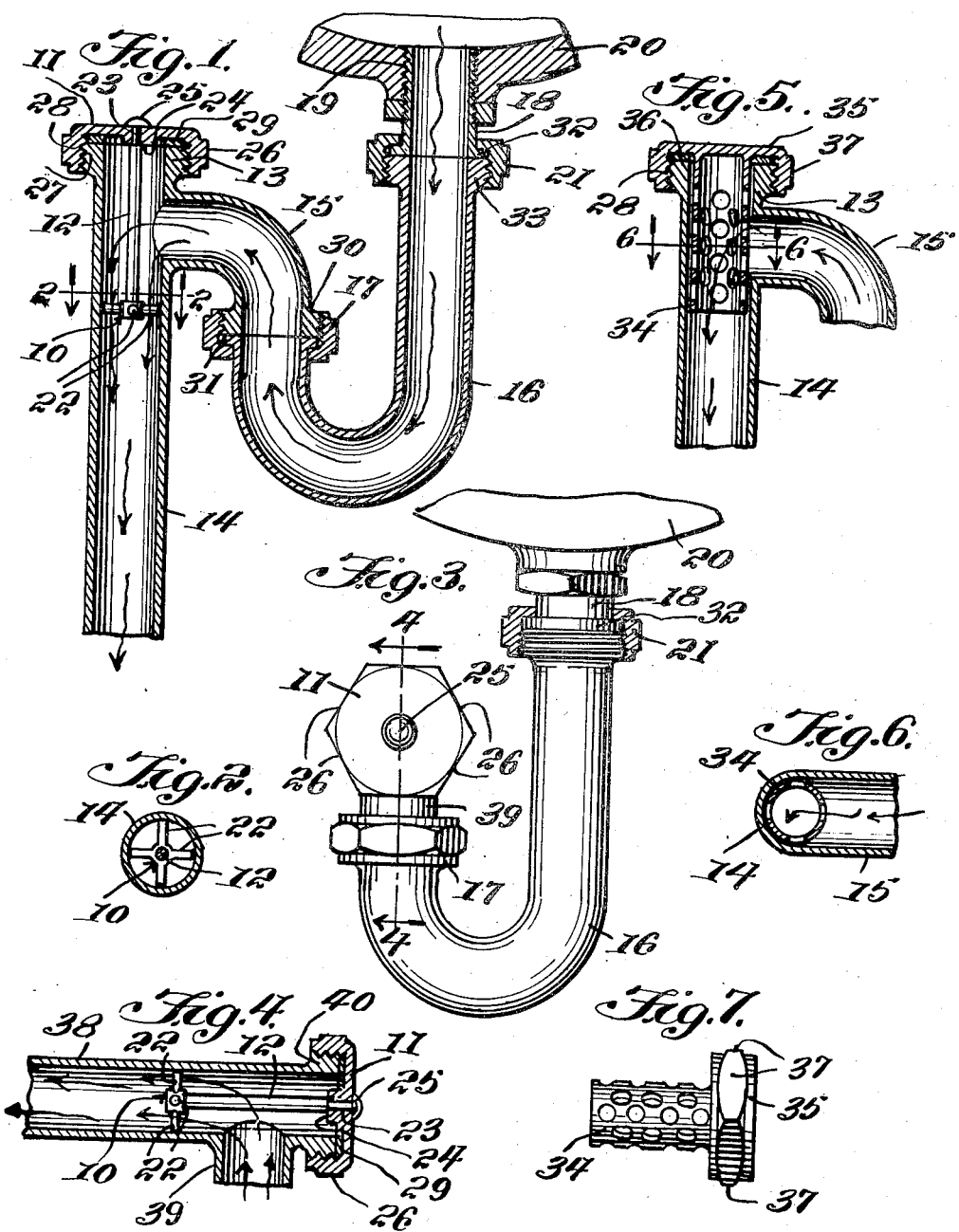
INVENTOR.
Dominick Dileo,
BY Victor J. Evans & Co.
ATTORNEYS Patented Sept. 8, 1953

2,651,382

UNITED STATES PATENT OFFICE 2,651,382

PLUMBING TRAP CLEANER

Dominick Dileo, Utica, N. Y.

Application October 9, 1950, Serial No. 189,261

1 Claim. (Cl. 182—23)

This invention relates to traps used in plumbing in combination with lavatories, sinks and other plumbing fixtures, and in particular a trap having a fitting with a nipple having a threaded end and a perforated sleeve or spider carried by a cap threaded on the end of the nipple and extended into the fitting to intercept the passage of water from the trap whereby grease, sediment, and other forms of foreign matter are caught by the sleeve or spider and may readily be removed.

The purpose of this invention is to provide means for readily cleaning traps of plumbing fixtures without taking the trap apart.

In the conventional type of trap, particularly of the P or S type it is necessary to remove the unions or coupling elements to remove the U-fitting forming the trap and in this operation it is necessary to provide means for taking care of water contained in the trap. With this thought in mind this invention contemplates a trap having an arresting element injected into an outlet passage thereof wherein it is only necessary to remove the arresting element in order to clean the trap.

The object of this invention is, therefore, to provide a cleaner for traps of plumbing fixtures with which the average layman may clean the trap.

Another object of the invention is to provide a cleaning element for traps of plumbing fixtures that may be installed in fitting connections of traps without changing the general design or arrangement thereof.

A further object of the invention is to provide a readily removable cleaning element for traps of plumbing fixtures that is of a simple and economical construction.

With these and other objects and advantages in view the invention embodies a plumbing trap having a connection with an extended nipple having a threaded end and an arresting element carried by a cap threaded on the end of the nipple and extended into an outlet passage of the trap.

Other features and advantages of the invention will appear from the following description taken in connection with the drawings wherein:

Figure 1 is a vertical longitudinal section through a plumbing trap of the type positioned in a drain of a lavatory showing an arresting spider in a vertical position and carried by a cap threaded on a nipple on the end of the vertical outflow pipe of the trap.

Figure 2 is a cross section through the outflow pipe taken on line 2—2 of Figure 1 also showing the arresting element.

Figure 3 is an elevational view similar to that shown in Figure 1 illustrating a modification wherein the cleaning element is positioned in a horizontal section of pipe.

Figure 4 is a longitudinal section taken on line 4—4 of Figure 3 showing the cleaner or arresting element mounted in the horizontal section of the pipe.

Figure 5 i sa vertical section illustrating the type of fitting shown in Figure 1 with a perforated sleeve in the upper end of the outflow pipe and with other parts broken away.

Figure 6 is a cross section through the sleeve and cleaner shown in Figure 5 being taken on line 6—6 thereof.

Figure 7 is a detail illustrating the perforated sleeve type of cleaner.

Referring now to the drawings wherein like reference characters denote corresponding parts the improved trap cleaner of this invention includes a spider 10 carried by a cap 11 by a stem 12 and, as illustrated in Figure 1 the cap 11 is threaded on the upper end of a nipple 13 on the end of an outflow pipe 14 and the pipe 14 is provided with an elbow 15 that is connected to a U-fitting 16 by a union 17, and the fitting 16 is connected to a nipple 18 in the drain opening 19 of a lavatory 20 by a union 21.

In the design illustrated in Figure 1 the spider 10 is provided with radially disposed arms 22 that extend outwardly from the hub of the spider and the hub is secured to the lower end of the stem 12 with the upper end of the stem formed with a reduced section 23 that is secured in an opening in a boss 24 by forming a rivet head 25 on the end of the reduced section of the stem.

The threaded cap 11 is provided with flat sides 26 and the inner surface is provided with threads 27 by which the cap is threaded on threads 28 on the end of the nipple 13. A gasket 29 is provided between the end of the nipple and inner surface of the cap for sealing the connection.

In this design the elbow 15 is integral with the outflow pipe 14 and the end of the elbow is provided with a threaded boss 30 upon which the union 17, which extends over a flange 31 on the U-fitting 16 is threaded.

The nipple 18 is provided with a similar flange 32 which is held by the union 21 against the end of the threaded boss 33 on the end of the U-fitting 16. The nipple 18 is mounted in the bottom of the lavatory or sink, as indicated by the numeral 20, in the usual manner.

The spider 10 may be replaced by a perforated sleeve 34, as illustrated in Figures 5 and 7, the sleeve 34 being carried by a cap 35, similar to the cap 11, and the cap 35 is threaded on the threads 28 of the outflow pipe 14 with a sealing gasket 36 between the end of the nipple 13 and the inner surface of the cap 35. The cap 35 is also provided with flat sides 37 to facilitate holding the cap by a wrench when inserting and removing the strainer or cleaner.

In the design illustrated in Figures 3 and 4 the outflow connection 14 is replaced by a horizontally disposed tube 38 that is provided with a nipple 39 which is attached to the end of the U-fitting 16 by the union 17. In this design the tube 38 is provided with a threaded boss 40 upon which the cap 11 is threaded and, as shown in the drawings the spider 10 is suspended from the cap by a stem 12 and the stem is secured in the cap, as illustrated in Figures 1 and 4.

It will be understood that in the design illustrated in Figures 3 and 4 the arresting or straining element may be removed and replaced by a perforated sleeve, similar to the sleeve 34 and having a threaded cap 35 on the end thereof.

With the parts arranged in this manner the element 10, or the perforated sleeve 34 are inserted in a discharge or outflow passage of a plumbing trap and grease, hairs, sediment, and other foreign matter passing through the trap and arrested by one of the cleaning elements is readily removed by removing the threaded cap 11 or 35 and withdrawing the elements suspended thereby. The foreign matter is readily cleaned from the elements and the element is readily inserted in the pipe or tube.

As illustrated in the drawing the threaded cap by which the cleaning element is suspended is positioned above the water level of the trap so that the element may be removed and replaced without draining water from the trap.

It will be understood that modifications may be made in the design and arrangement of the parts without departing from the spirit of the invention.

What is claimed is:

In a trap for plumbing fixtures, the combination which comprises a U-bend having a long arm and a short arm with coupling members positioned on the ends of the arms, an overflow pipe having an elbow for attaching the overflow pipe by one of said coupling members to the short arm of the U-bend with one end of the overflow pipe extended for a connection to a drain, said overflow pipe also having a threaded neck on the opposite end aligned with the said drain connection, and a cap threaded on the said threaded neck and means carried by said cap and extending into said overflow pipe beyond the connection of the elbow to said overflow pipe for cleaning the said drain connection.

DOMINICK DILEO.

References Cited in the file of this patent

UNITED STATES PATENTS

| Number | Name | Date |
| --- | --- | --- |
| 379,160 | Haythorn | Mar. 6, 1888 |
| 598,935 | Jewell | Feb. 15, 1898 |
| 861,493 | Bell | July 30, 1907 |
| 960,901 | Hall | June 7, 1910 |
| 965,836 | Ray | July 26, 1910 |
| 1,240,747 | McKeone | Sept. 18, 1917 |
| 1,450,956 | Gottsch | Apr. 10, 1923 |
| 1,679,191 | Westbrook | July 31, 1928 |